US011232202B2

(12) United States Patent
Maimon et al.

(10) Patent No.: US 11,232,202 B2
(45) Date of Patent: Jan. 25, 2022

(54) SYSTEM AND METHOD FOR IDENTIFYING ACTIVITY IN A COMPUTER SYSTEM

(71) Applicant: NEC Corporation Of America, Herzlia (IL)

(72) Inventors: Maya Maimon, Safed (IL); Yaacov Hoch, Ramat-Gan (IL); Yosef Reuven, Tel-Aviv (IL)

(73) Assignee: NEC Corporation Of America, Herzlia (IL)

( * ) Notice: Subject to any disclaimer, the term of this patent is extended or adjusted under 35 U.S.C. 154(b) by 350 days.

(21) Appl. No.: 16/246,597

(22) Filed: Jan. 14, 2019

(65) Prior Publication Data

US 2020/0226257 A1 Jul. 16, 2020

(51) Int. Cl.
*G06F 21/56* (2013.01)
*G06N 20/00* (2019.01)

(52) U.S. Cl.
CPC ........... *G06F 21/566* (2013.01); *G06N 20/00* (2019.01); *G06F 2221/034* (2013.01)

(58) Field of Classification Search
CPC . G06F 21/566; G06F 2221/034; G06N 20/00; G06N 20/10; G06N 5/003; G06N 7/005; G06N 3/0454; G06N 20/20
USPC ........................................................ 726/23
See application file for complete search history.

(56) References Cited

U.S. PATENT DOCUMENTS

| 2017/0251003 A1* | 8/2017 | Rostami-Hesarsorkh ................... H04L 63/1425 |
| 2020/0167464 A1* | 5/2020 | Griffin .................... G06F 40/20 |
| 2020/0202184 A1* | 6/2020 | Shrestha .............. G06K 9/6292 |

* cited by examiner

*Primary Examiner* — Jeffrey C Pwu
*Assistant Examiner* — Nega Woldemariam

(57) ABSTRACT

A method for producing a set of indicators of unwanted activity in a computer system, comprising: receiving a plurality of input data sets, each describing system activity and comprising an infection label and system activity information collected from a computer system;
  producing a plurality of training sets each comprising: 1) a plurality of activity values, each indicative of execution of an instruction, extracted from one of the plurality of input data sets, and 2) a respective infection label;
  producing for each training set one of a plurality of sets of relevant activity values by:
    training a model to output, in response to the respective training set, an infection classification equal to respective infection label; and
    analyzing the model to identify a set of relevant activity values, of the plurality of activity values, effecting the infection classification; and
  analyzing the plurality of sets of relevant activity values to produce the indicators.

18 Claims, 5 Drawing Sheets

SYSTEM AND METHOD FOR IDENTIFYING ACTIVITY IN A COMPUTER SYSTEM

FIELD AND BACKGROUND OF THE INVENTION

The present invention, in some embodiments thereof, relates to a computer system and, more specifically, but not exclusively, to identifying unwanted activity in a computer system.

The term "malicious software" refers to computer software intended to harm a host operating system and/or to disrupt operation of a computer system and/or to steal sensitive data from users, organizations or companies. Malicious software may include software that gathers user information without permission. A computer system is considered compromised when malicious software gains access to one or more resources of the computer system. Some examples of compromise are when the malicious software executes one or more instructions on a processor of the computer system and when the malicious software gathers data from a storage of the computer system.

Information technology professionals and other computer system administrators use a variety of means to try and prevent malicious software from compromising a computer system, as unwanted activity of malicious software may cause disruption to a service provided by the computer system and/or deletion of huge amounts of data. In addition, there is a need to identify when a computer system has been compromised by malicious software, to mitigate negative impact of the malicious software.

SUMMARY OF THE INVENTION

It is an object of the present invention to provide a system and a method for identifying unwanted activity in a computer system.

The foregoing and other objects are achieved by the features of the independent claims. Further implementation forms are apparent from the dependent claims, the description and the figures.

According to a first aspect of the invention, a method for producing a set of indicators of unwanted activity in a computer system comprises: receiving a plurality of input data sets, each describing system activity over an identified period of time and comprising an infection label and system activity information collected from a computer system; producing a plurality of training sets each comprising: 1) a plurality of activity values, each indicative of execution of an instruction by a computerized device of the computer system, extracted from one of the plurality of input data sets, and 2) a respective infection label; producing for each training set of the plurality of training sets one of a plurality of sets of relevant activity values by: training a classification model to output, in response to the respective training set, an infection classification equal to respective infection label; and analyzing the classification model to identify a set of relevant activity values, of the plurality of activity values, effecting the infection classification in response to the training data set; analyzing the plurality of sets of relevant activity values to produce the plurality of indicators of unwanted activity; and providing the plurality of indicators of unwanted activity to at least one security engine for the purpose of detecting unwanted activity in at least one other system.

According to a second aspect of the invention, a system for producing a set of indicators of unwanted activity in a computer system comprises at least one hardware processor adapted to: receiving a plurality of input data sets, each describing system activity over an identified period of time and comprising an infection label and system activity information collected from a computer system; producing a plurality of training sets each comprising: 1) a plurality of activity values, each indicative of execution of an instruction by a computerized device of the computer system, extracted from one of the plurality of input data sets, and 2) a respective infection label; producing for each training set of the plurality of training sets one of a plurality of sets of relevant activity values by: training a classification model to output, in response to the respective training set, an infection classification equal to respective infection label; and analyzing the classification model to identify a set of relevant activity values, of the plurality of activity values, effecting the infection classification in response to the training data set; analyzing the plurality of sets of relevant activity values to produce the plurality of indicators of unwanted activity; and providing the plurality of indicators of unwanted activity to at least one security engine for the purpose of detecting unwanted activity in at least one other system.

According to a third aspect of the invention, a system for identifying unwanted activity in a computer system comprises at least one hardware processor adapted to: receiving input data comprising system activity information collected from the computer system over an identified period of time; extracting a plurality of system activity values from the input data, each indicative of execution of an instruction by a computerized device of the computer system; identifying in the plurality of system activity values at least one indicator of unwanted activity of a plurality of indicators of unwanted activity, generated by at least one other hardware processor by analyzing a classification model trained to output an infection classification in response to a plurality of input system activity values; and outputting a determination of unwanted activity according to identifying the at least one indicator of unwanted activity.

With reference to the first and second aspects, in a first possible implementation of the first and second aspects of the present invention, each of the plurality of indicators of unwanted activity comprises at least one activity value of the plurality of activity values. Optionally, at least one activity value of the plurality of activity values is selected from a group of possible activity values consisting of: a time value, a network address value, a file name value, a file path value, a digital memory address value, an amount of digital memory, a registry key path value, a registry key value, a network protocol identifier value, a network port value, an amount of bytes, a user name value, a user account type value and a domain name value. Using at least one activity value extracted from one of the plurality of input data sets in an indicator of unwanted activity may facilitate using other values, extracted from another input data set captured in another system to identify other unwanted activity in the other system.

With reference to the first and second aspects, in a second possible implementation of the first and second aspects of the present invention, analyzing the classification model to identify a set of relevant activity values further comprises computing an importance value for each of the set of relevant activity values, indicative of a contribution of the relevant activity value to the infection classification. Using an importance value indicative of a contribution of a relevant activity value to an infection classification may allow reducing an amount of relevant activity values considered when identifying unwanted activity in a computer system, thus reducing an amount of time required to identify unwanted activity and additionally or alternatively reducing a cost of computation to identify unwanted activity. Optionally, the infection label is selected from a group of labels consisting of "infected" and "not infected". Optionally, the system activity information is collected from at least one information source selected from a group of information sources consisting of: an operating system log repository, a capture of network traffic, a security monitoring tool log repository, a network device log repository, a capture of memory access operations, a capture of processor utilization values, a capture of file accesses, and an application log repository. Using readily available information sources may facilitate reducing a cost of computation to identify unwanted activity as it reduces a need to produce additional information sources.

With reference to the first and second aspects, in a third possible implementation of the first and second aspects of the present invention, analyzing the plurality of sets of relevant activity values to produce the plurality of indicators of unwanted activity comprises at least one operation selected from a group of operations consisting of: an intersection between at least some of the plurality of sets of relevant activity values, sorting the plurality of relevant activity values of the plurality of sets of relevant activity values according to an identified sorting criterion, and applying a k-means classification method to at least some of the plurality of sets of relevant activity values.

With reference to the first and second aspects, in a fourth possible implementation of the first and second aspects of the present invention, the method further comprises: training at least one other classification model to output, in response to the respective training set, at least one other infection classification equal to respective infection label; and analyzing the at least one other classification model to identify at least one other set of relevant activity values, of the plurality of activity values, effecting the at least one other infection classification in response to the respective training data set. Using the plurality of training data sets to train more than one classification models may reduce cost of computation for computing more than one infection classification compared to using a unique plurality of training data sets to train each of the more than one classification models.

With reference to the first and second aspects, in a fifth possible implementation of the first and second aspects of the present invention, the at least one hardware processor is further adapted to sending the plurality of indicators of unwanted activity to at least one other hardware processor via at least one digital communication network interface connected to the at least one hardware processor. Optionally, the at least one hardware processor is adapted to receiving the plurality of input data sets via the at least one digital communication network interface. Optionally, the at least one hardware processor is further adapted to storing the plurality of indicators of unwanted activity on at least one non-volatile digital storage connected to the at least one hardware processor.

With reference to the third aspect, in a first possible implementation of the third aspect of the present invention, generating the plurality of indicators of unwanted activity by analyzing a classification model trained to output an infection classification in response to a plurality of input system activity values comprises: receiving a plurality of input data sets, each describing system activity over an identified period of time and comprising an infection label and system activity information collected from a training computer system; producing a plurality of training sets each comprising: 1) a plurality of activity values, each indicative of execution of an instruction by a training computerized device of the training computer system, extracted from one of the plurality of input data sets, and 2) a respective infection label; producing for each training set of the plurality of training sets one of a plurality of sets of relevant activity values by: training a classification model to output, in response to the respective training set, an infection classification equal to respective infection label; and analyzing the classification model to identify a set of relevant activity values, of the plurality of activity values, effecting the infection classification in response to the training data set; analyzing the plurality of sets of relevant activity values to produce the plurality of indicators of unwanted activity; and providing the plurality of indicators of unwanted activity to at least one security engine for the purpose of detecting unwanted activity in at least one other system.

With reference to the third aspect, in a second possible implementation of the third aspect of the present invention, the at least one hardware processor is adapted to receiving the input data via at least one digital communication network interface connected to the at least one hardware processor. Optionally, the at least one hardware processor is adapted to outputting the determination of unwanted activity via at least one display device connected to the at least one hardware processor. Optionally, the at least one hardware processor is adapted to outputting the determination of unwanted activity via at least one other digital communication network interface connected to the at least one hardware processor.

With reference to the third aspect, in a third possible implementation of the third aspect of the present invention, identifying in the plurality of system activity values at least one indicator of unwanted activity of the plurality of indicators of unwanted activity comprises identifying a match between the at least one indicator of unwanted activity and the plurality of system activity values according to at least one activity matching test. Optionally, the at least one indicator of unwanted activity comprises at least one activity value; and the at least one activity matching test comprises comparing the at least one activity value to at least one of the plurality of system activity values.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
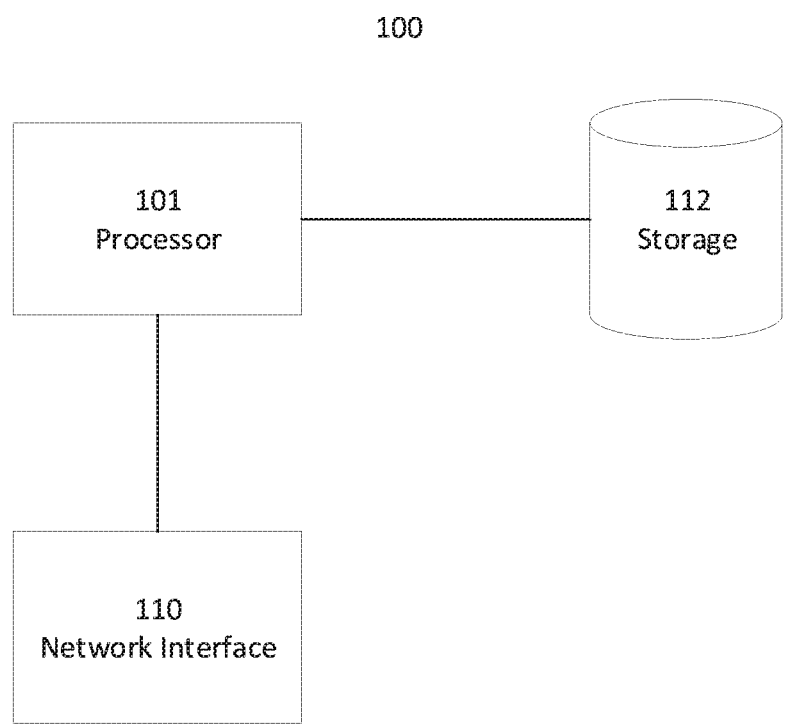
FIG. 1 is a schematic block diagram of an exemplary system for producing a plurality of indicators of unwanted activity, according to some embodiments of the present invention.

The present invention, in some embodiments thereof, relates to a computer system and, more specifically, but not exclusively, to identifying unwanted activity in a computer system.

Some computer systems implement methods for collecting information regarding activity in the computer system. These methods include monitoring network traffic, logging an application's activity, logging operating system activity, and logging security related activity, for example activity in a security domain manager. Some examples of activity are: creating a file on non-volatile digital storage, changing a name of a file on non-volatile digital storage, deleting a file from non-volatile digital storage, writing to a file on non-volatile digital storage, creating a registry key in an operating system registry, modifying a value of a registry key in an operating system registry, deleting a key from an operating system registry, sending a message via a digital communication network interface, receiving a message via a digital communication network interface, logging in to a domain, and changing a configuration of a user in a domain. When malicious software compromises a computer system, the collected information may include signs of the malicious software's activity. Some signs of malicious software activity are: existence of a file with an identified name, deletion or alteration of an identified operating system file, outbound network traffic unusual for normal operation of the computer system such as traffic to a blacklisted network address, an anomaly in activity in a privileged user account, a geographical irregularity such as accessing the computer system from a geographical location unusual for normal operation of the computer system, and increases in an amount of read operations from a database, an increase in a size of a message comprising HyperText Markup Language (HTML) content, a change to a registry value or a system file, an unusual Domain Name Server (DNS) request such as a DNS request comprising a blacklisted domain, a change in a profile of a mobile device, an unexpected installation of an operating system patch, and HyperText Transfer Protocol (HTTP) network traffic with a non-human behavior pattern. Such signs may be indicative of malicious software executing one or more instructions by a processor of the computer system or of malicious software retrieving data from a data repository. However, one malicious software may cause some signs of malicious software activity, whereas another malicious software may cause some other signs of malicious software activity.

There is a need to distinguish between signs of usual operation of the computer system and signs of unusual operation. In addition, there is a need to detect malicious activity early in an attack sequence. For example, an identified volume of network traffic may be usual under some identified circumstances, such as in response to an identified request, but may indicate one type of malicious software activity otherwise. In addition, it may be that when another type of malicious software activity exists there is no unusual network traffic.

As there are myriad types of malicious software, there is a need to reliably detect whether a computer system has been compromised by any malicious software.

The present invention, in some embodiments thereof, proposes identifying a reliable set of indicators of compromise, such that when one or more of the set of indicators of compromise is identified in data collected from a computer system there is a high likelihood the computer system is infected by malicious software, that is the computer system is compromised, and when none of the set of indicators of compromise is identified in the data collected from the computer system there is a high likelihood the computer system is not compromised. The malicious software may be previously known malicious software. Alternately, the malicious software may be software yet unknown to be malicious. To do so, in some embodiments thereof, the present invention proposes analyzing a classification model trained to output an infection classification in order to identify, for each of a plurality of input data sets collected from a computer system, a set of relevant features of respective input data set effecting respective infection classification. In such embodiments each of the input data sets describes system activity in a computer system over an identified period of time. Optionally, a plurality of features are extracted from each of the input data sets. A feature may be an activity value indicative of execution of an instruction by a computerized device of the computer system. Some examples of a computerized device are a computer, a laptop computer, a mobile device, a hardware processor controlled machine, a non-volatile digital storage controller, and a network device. Optionally, a feature is an activity value indicative of reading data from a data repository of the computer system. In addition, the present invention in some embodiments thereof, proposes analyzing a plurality of sets of relevant features, each identified for one of the plurality of input data sets, to produce a plurality of indicators of compromise. Each of the plurality of indicators of compromise optionally indicates unwanted activity in a computer system and optionally comprises one or more of a set of relevant features identified for one or more of the plurality of input data sets.

The present invention further proposes, in some embodiments of the present invention, using a plurality of indicators of unwanted activity, produced by analyzing a classification model in order to identify a plurality of relevant features, to determine whether data collected from a computer system indicates unwanted activity in the computer system. Using a plurality of indicators of compromise, produced by identifying a set of relevant features, or attribute values, contributing to an infection classification of an input data set by a classification model and using a plurality of sets of relevant features to produce a plurality of indicators of unwanted activity may increase accuracy of determining whether the data collected from the computer system indicates unwanted activity by malicious software in the computer system, increasing probability of correctly identifying unwanted activity and reducing false indication of unwanted activity, as well as facilitating detection of malicious software that cannot be detected according to only one indicator of unwanted activity at a time. In addition, using one plurality of indicators of unwanted activity to detect unwanted activity by any one of a plurality of possible malicious software may reduce an amount of time required to identify unwanted activity in the computer system. Increased accuracy in identifying unwanted activity and reducing the amount of time required to identify unwanted activity may increase stability of the computer system's operation, and in addition reduce operation costs which unwanted activity may cause.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

For brevity, the term "processor" is used to mean "at least one hardware processor" and the terms are used interchangeably.

Reference is now made to FIG. 1, showing a schematic block diagram of an exemplary system 100 for producing a plurality of indicators of unwanted activity, according to some embodiments of the present invention. In such embodiments, processor 101 is attached to at least one digital communication network interface 110, optionally for the purpose of receiving one or more input data sets each describing system activity over an identified period of time. Optionally, at least one digital communication interface 110 is connected to a local area network (LAN), for example an Ethernet network or a wireless network. Optionally, at least one digital communication interface 110 is connected to a wide area network, for example the Internet. Optionally, processor 101 sends an output of system 100, for example a plurality of indicators of unwanted activity, to at least one other hardware processor via at least one digital communication network interface 110.

Optionally, processor 101 is connected to at least one non-volatile digital storage 112, for the purpose of storing the plurality of indicators of unwanted activity. Some examples of a non-volatile digital storage are a hard disk drive, a network storage and a storage network. Optionally, processor 101 is electrically connected to at least one non-volatile digital storage 112. Optionally, processor 101 is connected to at least one non-volatile digital storage 112 via at least one digital communication network interface 110.

To produce a plurality of indicators of unwanted activity, in some embodiments of the present invention system 100 implements the following optional method.

Figure 2:
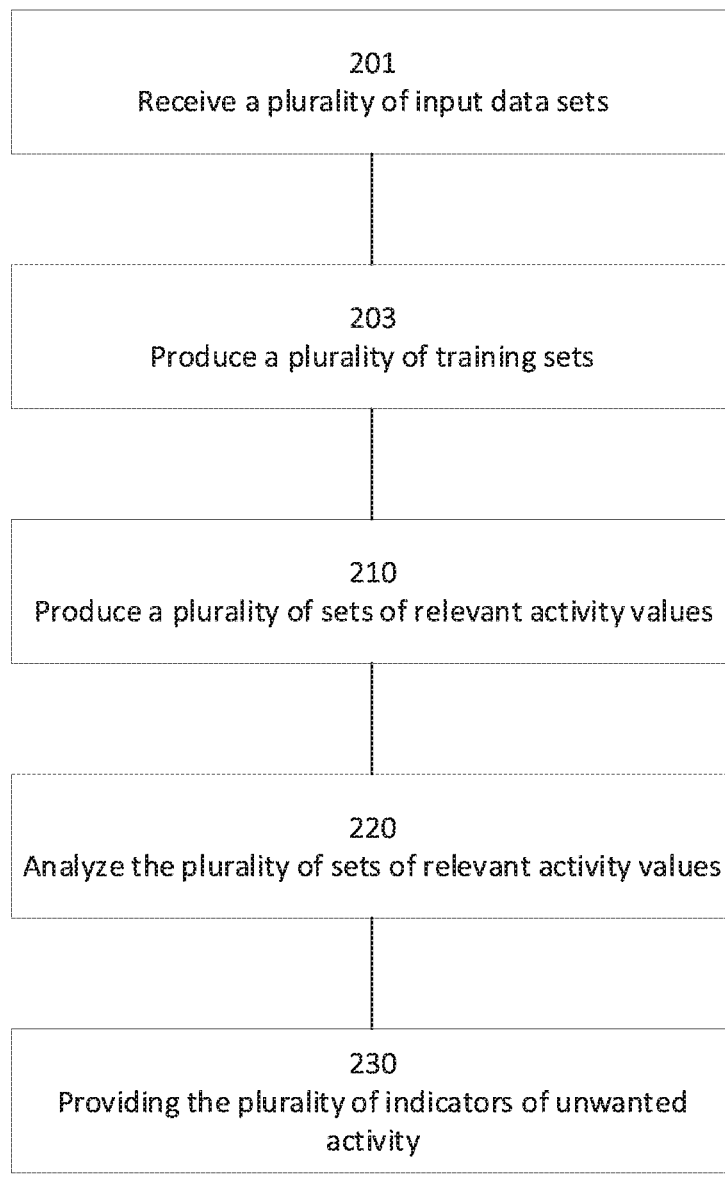
FIG. 2 is a flowchart schematically representing an optional flow of operations for producing a plurality of indicators of unwanted activity, according to some embodiments of the present invention.

Reference is now made also to FIG. 2, showing a flowchart schematically representing an optional flow of operations 200 for producing a plurality of indicators of unwanted activity, according to some embodiments of the present invention, In such embodiments, processor 101 receives in 201 a plurality of input data sets, each describing system activity of a computer system over an identified period of time. Some examples of system activity are: creating a file on non-volatile digital storage, changing a name of a file on non-volatile digital storage, deleting a file from non-volatile digital storage, writing to a file on non-volatile digital storage, creating a registry key in an operating system registry, modifying a value of a registry key in an operating system registry, deleting a key from an operating system registry, sending a message via a digital communication network interface, receiving a message via a digital communication network interface, logging in to a domain, and changing a configuration of a user in a domain. Optionally, each if the input data sets comprises an infection label and system activity information collected from the computer system. Optionally, the system activity information is collected from one or more activity information sources of the computer system. Some examples of an activity information source are: an operating system log repository, a capture of network traffic, a security monitoring tool log repository, a network device log repository, a capture of memory access operations, a capture of processor utilization values, a capture of file accesses, and an application log repository. Optionally the system activity information comprises one or more of: a memory access pattern, a processor utilization value, and an indication of access to a file. Optionally, the infection label is indicative of whether the input data set describes unwanted activity in the computer system. Some possible examples of an infection label are "infected" and "not-infected". Optionally, at least some of the system activity information is collected from at least one other computer system. In 203, processor 101 optionally produces a plurality of training sets, each comprising: 1) a plurality of activity values extracted from one of the plurality of input data sets, and 2) a respective infection label. Optionally, each of the plurality of activity values is indicative of execution of an instruction by a computerized device of the computer system or of reading data from a data repository of the computer system. Some examples of a computerized device are a computer, a laptop computer, a mobile device, a hardware processor controlled machine, a non-volatile digital storage controller, and a network device. Some examples of an activity value are: a time value, a network address value, a file name value, a file path value, a digital memory address value, an amount of digital memory, a registry key path value, a registry key value, a network protocol identifier value, a network port value, an amount of bytes, a user name value, a user account type value and a domain name value. Optionally the time value is indicative of an absolute time. Optionally, the time value is indicative of an interval. For example, when an input data set describes creating an operating system registry key and comprises at least some of an operating system log, the plurality of activity values may comprise a registry key path value of the operating system registry key, a registry key value of the operating system registry key, and a time value indicative of a time of creating the operating system registry key. In another example, when the input data set describes responding to an HTTP request message received from a suspect source and comprises at least some of a network capture, the plurality of activity values may comprise a source network address value of the suspect source, an amount of bytes in an HTTP response message sent in response to the HTTP request message, and another time value indicative of an amount of time between the HTTP request message and the HTTP response message. In 210, processor 101 optionally produces for each of the plurality of training sets one of a plurality of sets of relevant activity values.

Figure 3:
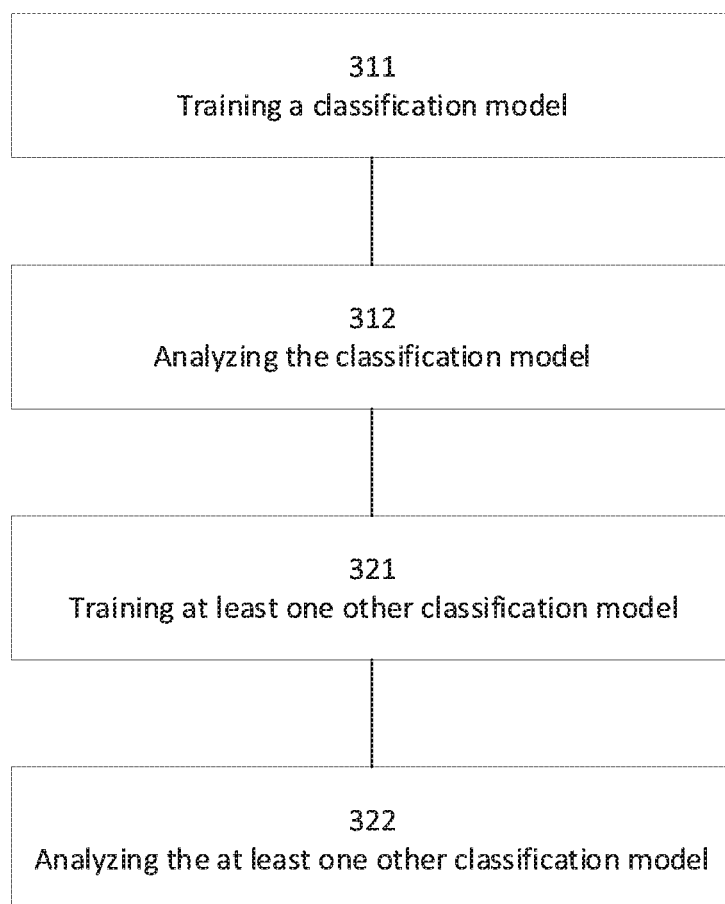
FIG. 3 is a flowchart schematically representing an optional flow of operations for producing a set of relevant activity values, according to some embodiments of the present invention.

Reference is now made also to FIG. 3, showing a flowchart schematically representing an optional flow of operations 300 for producing a set of relevant activity values, according to some embodiments of the present invention. In such embodiments, in 311 processor 101 trains a classification model to output, in response to a training set, an infection classification equal to the training set's infection label. Optionally, the classification model is a statistical model. Some examples of a statistical model are a neural network, a deep neural network, a random forest model, a logistic regression model, a naïve Bayes classifier, a support vector machine, a decision tree, a boosted tree, and a k-nearest neighbors model. Optionally, in 312 processor 101 analyzes the classification model to identify a set of relevant activity values, of the plurality of activity values, effecting the infection classification in response to the training data set. For example, when the infection classification is "infected" and the plurality of activity values comprises a first file path value associated with a known malicious software and a second file path value not associated with any known malicious software, the first file path value may affect the classifier outputting an infection classification of "infected", whereas the second file path value may have no effect on the infection classification. Optionally, processor 101 computes for each of the set of relevant activity values an importance value indicative of a contribution of the relevant activity value to the infection classification. For example, the set of relevant activity values may comprise the first file path value and the second file path value; the first file path value may be associated with a first importance value higher than a second importance value associated with the second file path value. Optionally, in 321 processor 101 trains one or more other classification models to output, in response to the training set, one or more other infection classifications each equal to the training set's infection label. Optionally, in 322 processor 101 analyzes the one or more other classification models to identify one or more other sets of relevant activity values, of the plurality of activity values, effecting the one or more other infection classifications in response to the training data set. Analyzing more than one classification model may increase an amount of sets of relevant activity values, which in turn may increase accuracy of a resulting plurality of indicators of unwanted activity.

Reference is now made again to FIG. 2. In 220, processor 101 optionally analyzes the plurality of sets of relevant activity values to produce the plurality of indicators of unwanted activity. Optionally, each of the plurality of indicators of unwanted activity comprises at least one activity value of the plurality of activity values. Optionally, an indicator of unwanted activity comprises more than one of the plurality of activity values. For example, an indicator of unwanted activity may comprise a registry key path value equal to a path indicating a command to execute upon reboot and a registry key value equal to an identified file name associated with an identified malicious software. Optionally, analyzing the plurality of sets of relevant activity values to produce the plurality of indicators of unwanted activity comprises sorting the plurality of relevant activity values of the plurality of sets of relevant activity values according to an identified sort criterion, for example according to a temporal order. Optionally, analyzing the plurality of sets of relevant activity values to produce the plurality of indicators of unwanted activity comprises computing an intersection between at least some of the plurality of relevant activity values, for example identifying that a first network address value of a first set of relevant activity values is equal to a second network address value of a second set of relevant activity values. Optionally, analyzing the plurality of sets of relevant activity values to produce the plurality of indicators of unwanted activity comprises applying a k-means classification method to at least some of the plurality of sets of relevant activity values, optionally in order to partition the plurality of relevant activity values of the plurality of sets of relevant activity values into a plurality clusters.

In 230, processor 101 optionally provides the plurality of indicators of unwanted activity to at least one security engine for the purpose of detecting unwanted activity in at least one other system.

In some embodiments of the present invention, a plurality of indicators of unwanted activity produced according to the present invention are used to identify unwanted activity in a computer system.

Figure 4:
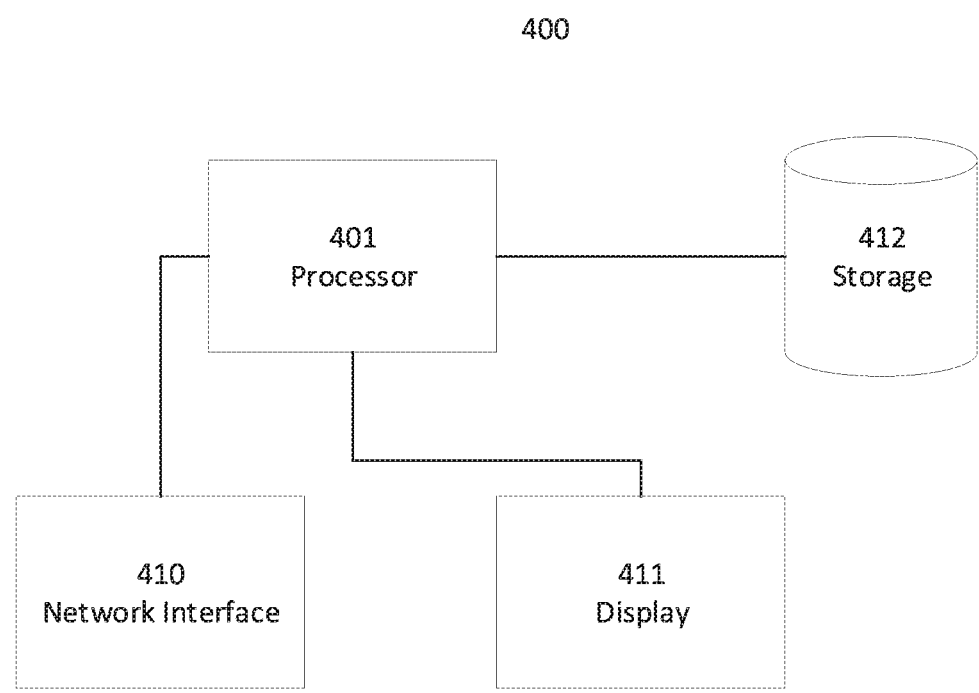
FIG. 4 is a schematic block diagram of an exemplary system for detecting unwanted activity, according to some embodiments of the present invention.

Reference is now made also to FIG. 4, showing a schematic block diagram of an exemplary system 400 for detecting unwanted activity, according to some embodiments of the present invention. In such embodiments, processor 401 is attached to at least one digital communication network interface 410, optionally for the purpose of receiving input data. Optionally, the input data is collected from another computer system. Optionally the input data describes system activity in the other computer system over another identified period of time. Optionally, at least one digital communication interface 410 is connected to a local area network (LAN), for example an Ethernet network or a wireless network. Optionally, at least one digital communication interface 410 is connected to a wide area network, for example the Internet. Optionally, processor 401 sends an output of system 400, for example a determination of unwanted activity, to at least one other hardware processor via at least one digital communication network interface 410. Optionally, at least one display device 411 is connected to processor 401. Optionally, processor 401 outputs the determination of unwanted activity via at least one display device 411. Some examples of a display device are a monitor and a computer screen.

Optionally, processor 401 is connected to at least one non-volatile digital storage 412, for the purpose of storing the determination of unwanted activity. Some examples of a non-volatile digital storage are a hard disk drive, a network storage and a storage network. Optionally, processor 401 is electrically connected to at least one non-volatile digital storage 412. Optionally, processor 401 is connected to at least one non-volatile digital storage 412 via at least one digital communication network interface 410.

To identify unwanted activity in a computer system, in some embodiments of the present invention system 400 implements the following optional method.

Figure 5:
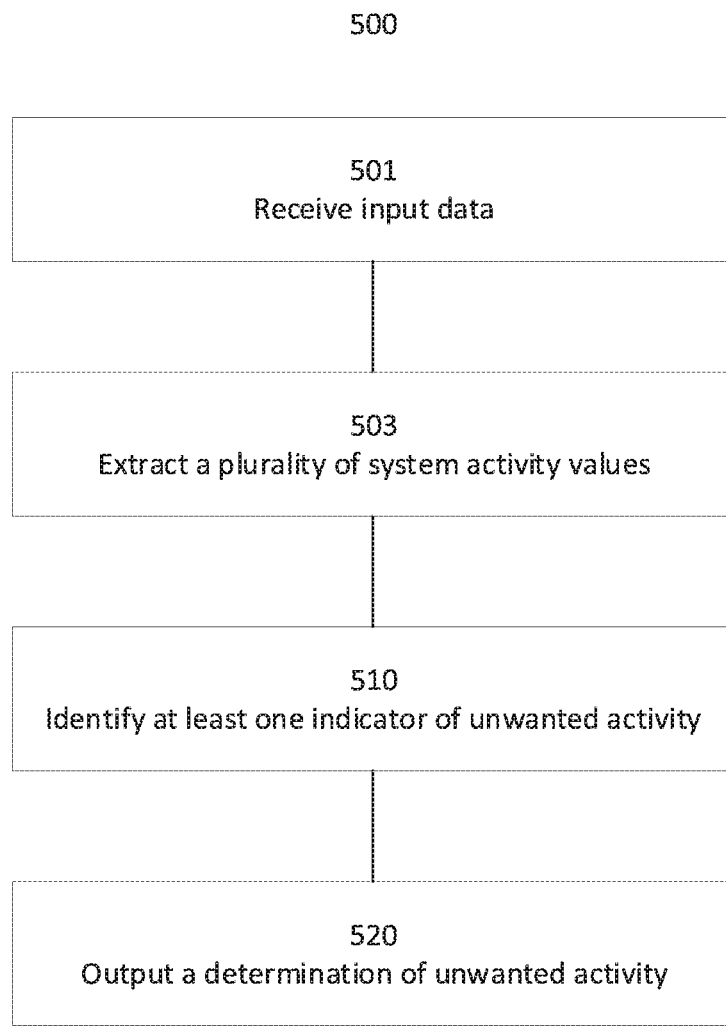
FIG. 5 is a flowchart schematically representing an optional flow of operations for detecting unwanted activity, according to some embodiments of the present invention.

Reference is now made also to FIG. 5, showing a flowchart schematically representing an optional flow of operations 500 for detecting unwanted activity, according to some embodiments of the present invention. In such embodiments, processor 401 receives in 501 input data collected from a computer system. Optionally, the input data comprises system activity information collected over another identified period of time. Some examples of system activity are: creating a file on non-volatile digital storage, changing a name of a file on non-volatile digital storage, deleting a file from non-volatile digital storage, writing to a file on non-volatile digital storage, creating a registry key in an operating system registry, modifying a value of a registry key in an operating system registry, deleting a key from an operating system registry, sending a message via a digital communication network interface, receiving a message via a digital communication network interface, logging in to a domain, and changing a configuration of a user in a domain. Optionally, the system activity information is collected from one or more activity information sources of the computer system. Some examples of an activity information source are: an operating system log repository, a capture of network traffic, a security monitoring tool log repository, a network device log repository, a capture of memory access operations, a capture of processor utilization values, a capture of file accesses, and an application log repository. In 503, processor 401 optionally extracts a plurality of system activity values from the input data. Optionally, each of the plurality of activity values is indicative of execution of an instruction by a computerized device of the computer system or of reading data from a data repository of the computer system. Some examples of a computerized device are a computer, a laptop computer, a mobile device, a hardware processor controlled machine, a non-volatile digital storage controller, and a network device. Some examples of an activity value are: a time value, a network address value, a file name value, a file path value, a digital memory address value, an amount of digital memory, a registry key path value, a registry key value, a network protocol identifier value, a network port value, an amount of bytes, a user name value, a user account type value and a domain name value. Optionally the time value is indicative of an absolute time. Optionally, the time value is indicative of an interval. In 510, processor 401 optionally identifies in the plurality of system activity values at least one indicator of unwanted activity of a plurality of indicators of unwanted activity. Optionally, the plurality of indicators of unwanted activity are generated by at least one other hardware processor by analyzing a classification model trained to output an infection classification in response to a plurality of input system activity values. Optionally, generating the plurality of indicators of unwanted activity comprises the at least one other hardware processor receiving a plurality of input data sets, each describing system activity over an identified period of time and comprising an infection label and system activity information collected from a training computer system; producing a plurality of training sets each comprising: 1) a plurality of activity values, each indicative of execution of an instruction by a computerized device of the computer system, extracted from one of the plurality of input data sets, and 2) a respective infection label; producing for each training set of the plurality of training sets one of a plurality of sets of relevant activity values; and analyzing the plurality of sets of relevant activity values to produce the plurality of indicators of unwanted activity. Optionally, each of the plurality of sets of relevant activity values is produced by training a classification model to output, in response to the respective training set, an infection classification equal to respective infection label, and analyzing the classification model to identify a set of relevant activity values, of the plurality of activity values, effecting the infection classification in response to the training data set. Optionally, the plurality of indicators of unwanted activity are generated by system 100, optionally using method 200.

Optionally, identifying in the plurality of system activity values at least one indicator of unwanted activity of the plurality of indicators of unwanted activity comprises identifying a match between the at least one indicator of unwanted activity and the plurality of system activity values according to at least one activity matching test. Optionally, the at least one indicator of unwanted activity comprises at least one activity value and the at least one activity matching test comprises comparing the at least one activity value to at least one of the plurality of system activity values. For example, when an indicator of unwanted activity comprises an identified operating system registry key path value, a possible matching test may comprise comparing the identified operating system registry key path value to at least some of the plurality of system activity values, and identifying at least part of the identified operating system registry key path value in one or more system activity values of the plurality of system activity values.

In 520, processor 401 optionally outputs a determination of unwanted activity according to identifying the at least one indicator of unwanted activity. For example, when processor 401 identifies a match between at least one indicator of unwanted activity and one or more of the plurality of system activity values, processor 401 optionally determines the computer system is infected and outputs a determination value of "infected". In another example, when processor 401 identifies no match between the plurality of indicators of unwanted activity and the plurality of system activity values, processor 401 optionally determines the computer system is not-infected and outputs determination value of "not-infected". Optionally, processor 401 computes an infection score, indicative of a likelihood of the determination of unwanted activity.

Optionally, processor 401 sends the determination of unwanted activity to at least one other hardware processor via at least one digital communication network interface 410. Optionally, processor 401 stores the determination of unwanted activity on at least one non-volatile storage 412. Optionally, processor 401 outputs the determination of unwanted activity on at least one display device 411.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant unwanted activity and activity values will be developed and the scope of the terms "unwanted activity" and "activity values" are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for producing a set of indicators of unwanted activity in a computer system, comprising:
   receiving a plurality of input data sets, each describing system activity of a computer system, over an identified period of time and comprising an infection label and system activity information collected from said computer system;
   producing a plurality of training sets, wherein each of the plurality of training sets comprising: 1) a plurality of system activity values, wherein each of the plurality of system activity values is indicative of an execution of a respective instruction of a plurality of instructions executed by a computerized device of the computer system, and extracted from one of the plurality of input data sets, and 2) a respective infection label, wherein at least one system activity value of the plurality of system activity values, associated with a certain one of the plurality of instructions, is selected from a group consisting of: a time value, a network address value, a file name value, a file path value, a digital memory address value, an amount of digital memory, a registry key path value, a registry key value, a network protocol identifier value, a network port value, an amount of bytes, a user name value, a user account type value and a domain name value;

producing for each training set of the plurality of training sets one of a plurality of sets of relevant system activity values by:

training a classification model to output, in response to the respective training set, an infection classification equal to respective infection label; and analyzing the classification model to identify a set of relevant system activity values, of the plurality of system activity values, effecting the infection classification in response to the training data set;

analyzing the plurality of sets of relevant system activity values to produce the plurality of indicators of unwanted activity;

providing the plurality of indicators of unwanted activity to at least one security engine for the purpose of detecting unwanted activity in at least one other computer system; and wherein analyzing the plurality of sets of relevant system activity values to produce the plurality of indicators of unwanted activity comprises at least one operation selected from a group of operations consisting of:

an intersection between at least some of the plurality of sets of relevant system activity values, sorting the plurality of relevant system activity values of the plurality of sets of relevant system activity values according to an identified sorting criterion, and applying a k-means classification method to at least some of the plurality of sets of relevant system activity values.

2. The method of claim 1, wherein each of the plurality of indicators of unwanted activity comprises at least one system activity value of the plurality of system activity values.

3. The method of claim 1, wherein analyzing the classification model to identify a set of relevant system activity values further comprises computing an importance value for each of the set of relevant system activity values, indicative of a contribution of the relevant system activity value to the infection classification.

4. The method of claim 1, wherein the infection label is selected from a group of labels consisting of "infected" and "not infected".

5. The method of claim 1, wherein the system activity information is collected from at least one information source selected from a group of information sources consisting of: an operating system log repository, a capture of network traffic, a security monitoring tool log repository, a network device log repository, a capture of memory access operations, a capture of processor utilization values, a capture of file accesses, and an application log repository.

6. The method of claim 1, further comprising:

training at least one other classification model to output, in response to the respective training set, at least one other infection classification equal to respective infection label; and analyzing the at least one other classification model to identify at least one other set of relevant system activity values, of the plurality of system activity values, effecting the at least one other infection classification in response to the respective training data set.

7. A system for producing a set of indicators of unwanted activity in a computer system, comprising at least one hardware processor adapted to:

receiving a plurality of input data sets, each describing system activity of a computer system over an identified period of time and comprising an infection label and system activity information collected from said computer system;

producing a plurality of training sets, wherein each of the plurality of training sets comprising: 1) a plurality of system activity values, wherein each of the plurality of system activity values is indicative of an execution of a respective instruction of a plurality of instructions executed by a computerized device of the computer system, and extracted from one of the plurality of input data sets, and 2) a respective infection label, wherein at least one system activity value of the plurality of system activity values, associated with a certain one of the plurality of instructions, is selected from a group consisting of: a time value, a network address value, a file name value, a file path value, a digital memory address value, an amount of digital memory, a registry key path value, a registry key value, a network protocol identifier value, a network port value, an amount of bytes, a user name value, a user account type value and a domain name value;

producing for each training set of the plurality of training sets one of a plurality of sets of relevant system activity values by:

training a classification model to output, in response to the respective training set, an infection classification equal to respective infection label; and analyzing the classification model to identify a set of relevant system activity values, of the plurality of system activity values, effecting the infection classification in response to the training data set;

analyzing the plurality of sets of relevant system activity values to produce the plurality of indicators of unwanted activity;

providing the plurality of indicators of unwanted activity to at least one security engine for the purpose of detecting unwanted activity in at least one other computer system; and wherein analyzing the plurality of sets of relevant system activity values to produce the plurality of indicators of unwanted activity comprises at least one operation selected from a group of operations consisting of:

an intersection between at least some of the plurality of sets of relevant system activity values, sorting the plurality of relevant system activity values of the plurality of sets of relevant system activity values according to an identified sorting criterion, and applying a k-means classification method to at least some of the plurality of sets of relevant system activity values.

8. The system of claim 7, wherein the at least one hardware processor is further adapted to sending the plurality of indicators of unwanted activity to at least one other hardware processor via at least one digital communication network interface connected to the at least one hardware processor.

9. The system of claim 8, wherein the at least one hardware processor is adapted to receiving the plurality of input data sets via the at least one digital communication network interface.

10. The system of claim 7, wherein the at least one hardware processor is further adapted to storing the plurality of indicators of unwanted activity on at least one non-volatile digital storage connected to the at least one hardware processor.

11. A system for identifying unwanted activity in a computer system, comprising at least one hardware processor adapted to:
- receiving input data comprising system activity information collected from the computer system over an identified period of time;
- extracting a plurality of system activity values from the input data, wherein each of the plurality of system activity values is indicative of an execution of a respective instruction of a plurality of instructions executed by a computerized device of the computer system, wherein at least one system activity value of the plurality of system activity values, associated with a certain one of the plurality of instructions, is selected from a group consisting of: a time value, a network address value, a file name value, a file path value, a digital memory address value, an amount of digital memory, a registry key path value, a registry key value, a network protocol identifier value, a network port value, an amount of bytes, a user name value, a user account type value and a domain name value;
- identifying in the plurality of system activity values at least one indicator of unwanted activity of a plurality of indicators of unwanted activity, generated by at least one other hardware processor by analyzing a classification model trained to output an infection classification in response to a plurality of input system activity values;
- outputting a determination of unwanted activity according to identifying the at least one indicator of unwanted activity; and
- wherein analyzing the plurality of sets of relevant system activity values to produce the plurality of indicators of unwanted activity comprises at least one operation selected from a group of operations consisting of:
- an intersection between at least some of the plurality of sets of relevant system activity values, sorting the plurality of relevant system activity values of the plurality of sets of relevant system activity values according to an identified sorting criterion, and applying a k-means classification method to at least some of the plurality of sets of relevant system activity values.

12. The system of claim 11, wherein generating the plurality of indicators of unwanted activity by analyzing a classification model trained to output an infection classification in response to a plurality of input system activity values comprises:
- receiving a plurality of input data sets, each describing system activity over an identified period of time and comprising an infection label and system activity information collected from a training computer system;
- producing a plurality of training sets, wherein each of the plurality of training sets comprising: 1) a plurality of activity values, wherein each of the plurality of activity values is indicative of an execution of a respective instruction of a plurality of instructions executed by a training computerized device of the training computer system, extracted from one of the plurality of input data sets, and 2) a respective infection label;
- producing for each training set of the plurality of training sets one of a plurality of sets of relevant activity values by:
  - training a classification model to output, in response to the respective training set, an infection classification equal to respective infection label; and
  - analyzing the classification model to identify a set of relevant activity values, of the plurality of activity values, effecting the infection classification in response to the training data set;
- analyzing the plurality of sets of relevant activity values to produce the plurality of indicators of unwanted activity; and
- providing the plurality of indicators of unwanted activity to at least one security engine for the purpose of detecting unwanted activity in at least one other system.

13. The system of claim 11, wherein the at least one hardware processor is adapted to receiving the input data via at least one digital communication network interface connected to the at least one hardware processor.

14. The system of claim 11, wherein the at least one hardware processor is adapted to outputting the determination of unwanted activity via at least one display device connected to the at least one hardware processor.

15. The system of claim 11, wherein the at least one hardware processor is adapted to outputting the determination of unwanted activity via at least one other digital communication network interface connected to the at least one hardware processor.

16. The system of claim 11, wherein identifying in the plurality of system activity values at least one indicator of unwanted activity of the plurality of indicators of unwanted activity comprises identifying a match between the at least one indicator of unwanted activity and the plurality of system activity values according to at least one activity matching test.

17. The system of claim 16, wherein the at least one indicator of unwanted activity comprises at least one activity value; and
- wherein the at least one activity matching test comprises comparing the at least one activity value to at least one of the plurality of system activity values.

18. The method of claim 1, wherein the system activity of said computer system is a member of a group consisting of: creating a file on non-volatile digital storage, changing a name of a file on non-volatile digital storage, deleting a file from non-volatile digital storage, writing to a file on non-volatile digital storage, creating a registry key in an operating system registry, modifying a value of a registry key in an operating system registry, deleting a key from an operating system registry, sending a message via a digital communication network interface, receiving a message via a digital communication network interface, logging in to a domain, and changing a configuration of a user in a domain.

* * * * *